Feb. 13, 1962  E. G. SEIBOLD ETAL  3,020,719
VARIABLE SLIP FLUID COUPLING
Filed June 20, 1957  2 Sheets-Sheet 1

INVENTORS:
Ernst G. Seibold
Hellmut K. Müller
BY

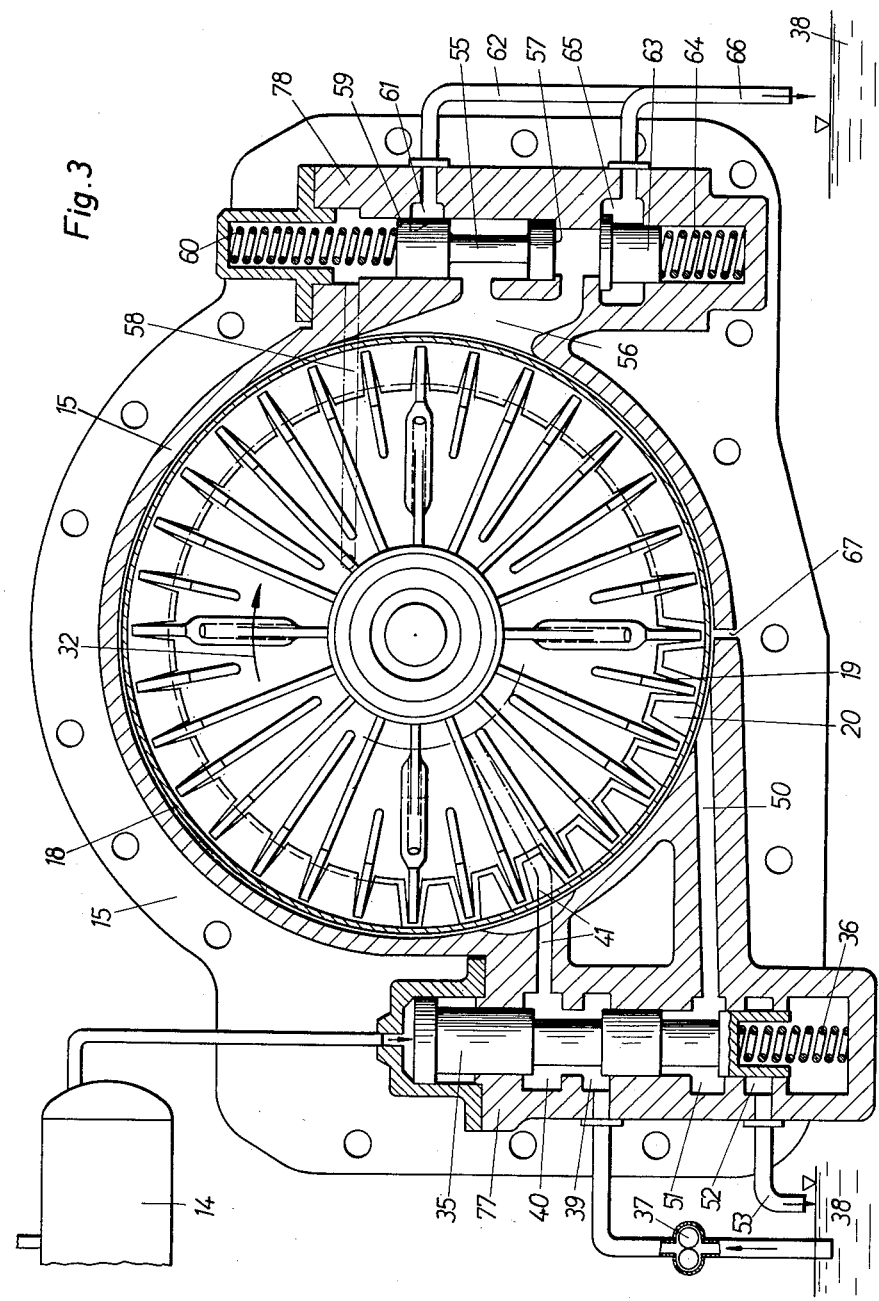

United States Patent Office 3,020,719
Patented Feb. 13, 1962

3,020,719
VARIABLE SLIP FLUID COUPLING
Ernst G. Seibold and Helmut K. Müller, Heidenheim (Brenz), Germany, assignors to J. M. Voith G.m.b.H. Maschinenfabrik, Heidenheim (Brenz), Germany
Filed June 20, 1957, Ser. No. 667,315
Claims priority, application Germany June 25, 1956
8 Claims. (Cl. 60—54)

The present invention relates to a power plant comprising a prime mover, a fluid coupling, and a machine or device to be driven by said prime mover through the intervention of said fluid coupling. More particularly, the invention relates to power plants of the above mentioned type in which at a high or maximum useful torque a considerable slip will be required in the coupling over a long period of operation while safety of operation of the coupling control must be assured.

It is an object of the present invention to provide an improved power plant of the above mentioned type.

It is another object of this invention to provide a power plant of the above mentioned type which will be simpler in construction and more favorable in operation than heretofore known power plants of the type involved.

These and other objects and advantages of the invention will appear more clearly from the following specification in connection with the accompanying drawings, in which:

FIG. 3 is a section along the line III—III of FIG. 2.

*General arrangement*

Figure 1:
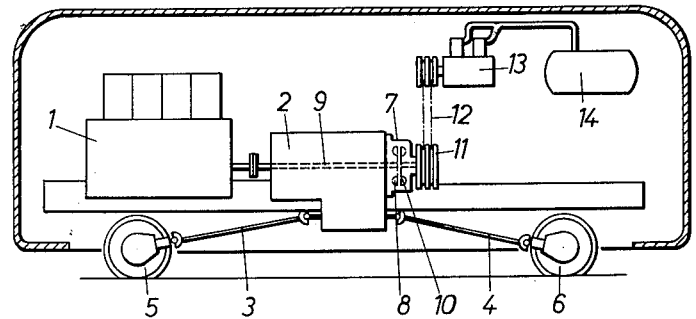
FIG. 1 is a diagrammatic illustration of a power plant according to the invention which, for purpose of example only, represents a switch engine with a compressor for delivery braking air and with a variable fluid coupling.

In conformity with the present invention, in combination with a power plant of the above mentioned type there is provided a fluid coupling which is variable as to its filling and which comprises a stationary coupling housing sealing the working chamber of the coupling toward the outside while the control members for the control of the filling are arranged in or on the coupling casing. While fluid couplings with stationary coupling casings are known per se, they have been seldom used in view of their poor efficiency caused by the wall friction between the rotating wheels and the stationary casing. The present invention is based on the finding that in combination with a prime mover and a machine driven through said coupling in cases where the coupling must have a high slip over a considerable time of operation, and only in such instances, the influence of the wall friction referred to in the preceding sentence is immaterial because in view of the reduced coupling filling and intentionally increased slip over a relatively long period of time, the degree of efficiency of the coupling is automatically low and sometimes only 50 to 60%. With regard to such low efficiency, the influence of the above mentioned wall friction is practically of no concern.

On the other hand, the stationary casing sealing the interior of the coupling toward the outside brings about considerable advantages including a simple and relatively inexpensive construction of the coupling and above all a very safe control during the operation. In such an instance the control elements for controlling the filling can be designed very simple and so that they will be easily accessible and can be easily watched while being mounted on the casing. In contrast thereto, with couplings having a rotating casing, the control elements must either be mounted on rotating coupling parts or must be designed as non-rotating scoops in which instance they are accessible only under difficulties. Moreover, such construction with the control members rotating with the rotating casing is rather awkward and very liable to disorders. When employing a stationary scoop, the scoop is liable to break in view of the pulsating fluid forces. In such an instance the coupling would immediately be filled completely, and the driven machine, which may for instance be a compressor, would break in view of excessive speed.

In order with the arrangement according to the invention to keep the wall friction at a minimum in spite of the stationary coupling casing, in conformity with a further development of the present invention, a ring- or bowl-shaped member connected to the turbine wheel is provided which surrounds the pumping wheel either partially or entirely from the outside. This ring-shaped member is provided along its outer periphery with recesses, openings or the like having a large cross section in order to allow a complete and quick discharge of the fluid from the working chamber of the coupling. The wall friction between the said ring member and the casing will then be less than between corresponding portions of the pumping wheel and the casing inasmuch as the turbine speed is always less than the speed of the pumping wheel by the slip. The now additionally occurring wall friction between the pumping wheel and the said ring member will then be effective as useful torque on the output side and thus is not to be considered as loss.

Inasmuch as the wall friction losses increase with the fifth power of the diameter, it is already sufficient when the said ring member merely surrounds the outer diameter area of the pumping wheel. For purposes of facilitating the installation, the said ring member connected to the turbine wheel and partly surrounding the pumping wheel from the outside as well as the immediately adjacent part of the back of the pumping wheel is designed in the manner of a ring gear in such a way that pumping wheel and turbine wheel can easily be brought into the proper mutual position by axially displacing the same.

A further reduction in the wall friction losses may be obtained by selecting the outer diameter of the working chamber of the fluid coupling so small as it will be admissible with regard to the torques to be conveyed. In this connection, especially with piston type compressors or other piston actuated machines it is to be taken into consideration that the starting torque, i.e. the torque required for overcoming the friction of the rest position, sometimes equals three times the maximum torque of operation. In such instances, the outer diameter of the working chamber is to be selected so small that the fluid coupling when completely filled and at the minimum admissible pumping wheel speed and thus at the lowest motor speed with the turbine wheel (and the compressor) at a standstill will still convey a torque which is greater than the starting torque by a minimum admissible safety value.

The efforts in reducing the outer diameter and thereby the wall friction may be aided by dimensioning also the inner diameter of the coupling working chamber as small as possible, namely so small as will be possible with regard to the dimensions of the coupling shafts and the bearings therefor.

*Structural arrangement*

Referring now to the drawings in detail, the switch engine shown in FIG. 1 comprises a prime mover or internal combustion engine 1 which through the fluid transmission 2 and the drive shafts or Cardan shafts 3 and 4 drives the driving wheels 5 and 6. That end of the fluid transmission 2 which is remote from the internal combustion engine 1 has flanged thereto a fluid coupling 7 the filling of which is variable. The impeller or pumping wheel 8 of the coupling 7 is drivingly connected with the engine 1 through the transmission shaft 9. The turbine wheel 10 is adapted through the V-belt pulley 11 and V-belt 12 to drive the piston actuated compressor 13 which furnishes the braking air to the air reservoir 14 for actuating the vehicle's brakes.

The transmission between the engine 1 and the compressor, and the dimensions of the fluid coupling are so selected that on one hand at idling engine 1 and with the fluid coupling filled completely, the speed of the compressor will not drop below a certain minimum speed. On the other hand, during considerable periods of operation during which the driving engine 1 will in conformity with the required vehicle speed have a high speed of rotation, the coupling must be emptied from actuating fluid to such an extent that the maximum permissible compressor speed will not be exceeded. Furthermore, also during the operation with high coupling slip, a coupling torque is to be conveyed which corresponds approximately to the maximum compressor torque of operation.

Figure 2:
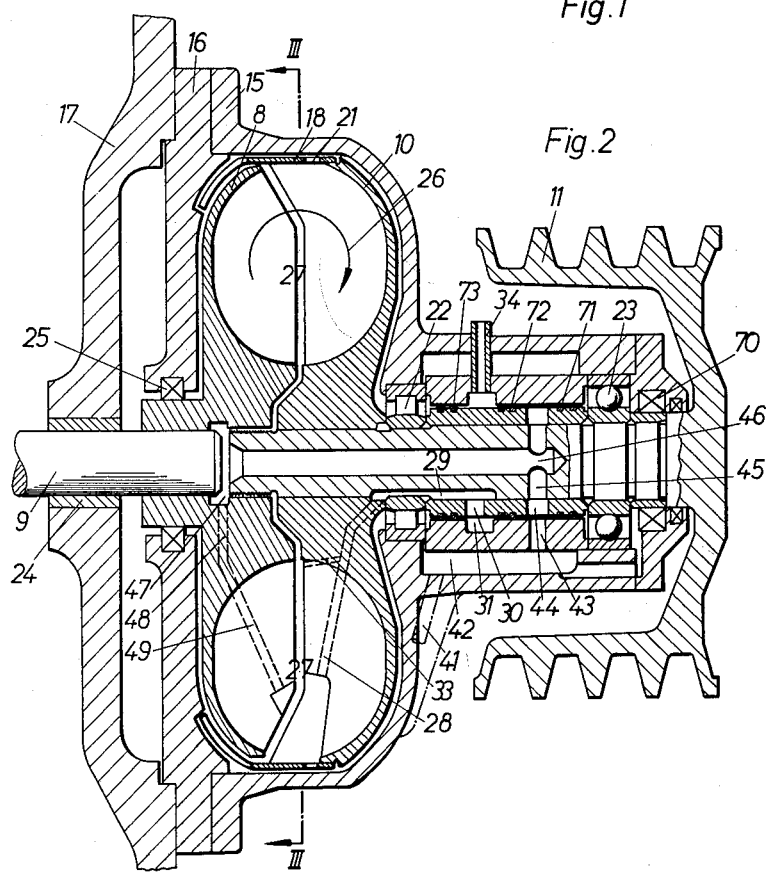
FIG. 2 illustrates on a larger scale than that of FIG. 1 an axial section through the fluid coupling of FIG. 1.

The fluid coupling generally designated 7 in FIG. 1 is illustrated on a larger scale in FIGS. 2 and 3. As will be clearly evident from these figures, the extension of the fluid transmission shaft 9 has rotatably connected thereto the pumping wheel 8. The turbine wheel 10 is through its shaft rotatably connected with the V-belt pulley 11. Both the pumping wheel 8 and the turbine wheel 10 are surrounded and encased by a stationary two-part coupling casing 15 and 16 which seals the interior of the coupling towards the outside and additionally supports the control elements 77 and 78 (FIG. 3). Sealing means 25, 70, 71, 72 and 73 are additionally provided for effecting a proper seal. The casing portion 16 of the coupling 7 is flanged to the housing 17 of the fluid transmission. The turbine wheel 10 has furthermore connected thereto an annular or bowl-shaped member 18 which from the outside surrounds a portion of the pumping wheel 8. The radially outwardly located portion of the back wall of the pumping wheel 8 as well as the adjacent portion of the annular member 18 are provided with teeth 19 and 20 respectively (see FIG. 3) so that, when the coupling is being installed or dismantled, both wheels including the overhanging bowl-shaped member 18 can easily be placed into their proper mutual position of operation by axial displacement thereof. If the teeth 20 and 19 of pumping wheel 8 and annular member 18 were not provided, it would be necessary, when installing or dismantling the coupling, to detach the annular member 18 from the turbine wheel, which would amount to a considerable increase in the cost of labor. The spaces between the teeth 20 and the openings 21 of the annular member 18 prevent said annular member from retaining a portion of the working fluid when the coupling is emptied.

Advantageously, the pumping wheel 8 is arranged in overhang position in a manner known per se on the transmission shaft 9 in order to reduce the bearings and sealings and the rotating primary masses to thereby reduce the possibility of oscillations. The bearing for the pumping wheel shaft is expediently arranged outside the coupling chamber which receives the working fluid. In such an instance, with running motor and the coupling in ineffective position (completely emptied), no bearing within the coupling chamber will have to be lubricated. In this way, it is avoided that lubricating oil of such coupling bearings will enter the empty working chamber of the coupling and will heat the same.

As will be evident from FIG. 2, that bearing 24 for the drive shaft 9 which is adjacent the pumping wheel 8 is sealed by a seal 25 with regard to the interior of the coupling. The bearings 22 and 23 for the turbine wheel shaft do not require any lubrication at this condition of operation inasmuch as the turbine wheel will be at a standstill when the coupling is emptied. When the coupling is filled, these bearings will be lubricated by the coupling oil representing the actuating fluid for the coupling.

During the starting period, especially of piston type prime movers, the fluid coupling has to overcome the starting torque referred to in the introductory portion to the specification. During this period, a particularly strong circulatory flow will build up in the working chamber of the coupling between the pumping wheel and the turbine wheel as indicated by the arrow 26 in FIG. 2. This circulatory flow must not act against the filling pressure of the filling pump since otherwise only a partial filling of the coupling would be obtained or the filling pump would have to be designed for a high pressure. Therefore, the filling passages or conduits are in a manner known per se arranged in the pumping wheel blades so that they will extend radially outwardly into the core chamber 27. These filling passages will then be additionally acting as pressure increasing pumping means.

In order to accelerate the filling operation, venting passages 28 are arranged in the turbine blades which starting at the core chamber lead preferably radially inwardly and communicate with a chamber in which no additional pressure prevails. Thus, the air accumulated in the core chamber 27 may escape through the venting passages 28 and the passages 29, 30, 31 and 34 into a chamber where no pressure exists above atmospheric pressure.

At reduced circulatory flow but high peripheral speeds in the direction of the arrow 32 (FIG. 3), air will accumulate near the axis of the working chamber. Therefore, it is further advantageous to provide additional venting passages 33 which extend from points adjacent the axis of the working chamber to a chamber without additional pressure, the cross sections of said last mentioned passages 33 being, however, considerably less than the cross sections of the first mentioned venting passages 28. Thus, with strong circulatory flow, the venting passages 28 will be effective whereas with low circulatory flow the venting passages 33 will be effective.

The control mechanism for the fluid coupling expediently comprises two separate control elements for instance two valve spools one of which is designed as control member for engaging and disengaging the fluid coupling and selectively establishing communication between the working chamber of the coupling and the filling pump or between the working chamber of the coupling and a discharging conduit. The other control member serves for controlling the filling of the working chamber and specifically for infinitely varying the magnitude of the discharge opening of the coupling chamber to thereby control the degree of filling of the latter.

In many fields of application, particularly when the machine to be driven such as a piston type compressor, must not exceed a maximum speed, it is advantageous to provide an automatic filling control in conformity with the turbine wheel speed or with the centrifugal pressure of the coupling fluid. With an automatic control in conformity with the centrifugal pressure, it is furthermore advantageous that the superimposed pressure which occurs when the coupling is completely filled and which is reduced by the filling pump be balanced or compensated for since otherwise such superimposed pressure will affect the control and will bring about a hunting. Therefore, the filling control member according to the invention is so designed that on one hand it will be affected by the centrifugal pressure and the superimposed pressure of the coupling fluid in the direction toward a reduction of the filling, and on the other hand will be affected by the superimposed pressure and a return force such as a return spring, in the direction of an increase of the filling.

More specifically, with reference to FIG. 3, the filling and emptying of the fluid coupling is effected by the inlet and outlet valve 77 having a displaceable valve spool 35. As long as the air pressure in the braking air reservoir 14 does not exceed a certain maximum pressure, the valve spool 35 will by means of a spring 36 be maintained in its uppermost position with regard to FIG. 3. In this position, the delivery pump 37 is adapted to deliver oil from the reservoir 38 through the control passages 39 and 40 and the connecting passages 41 into the annular chamber 42. From here the oil passes through passages 43, 44, 45, the axial bore 46 in the turbine shaft, the annular chamber 47, passages 48 and the radially outwardly extending passages 49 provided in the pumping wheel blades into the core chamber 24 of the coupling working chamber. The piston ring sealings 71, 72 and 73 seal the filling passages 43, 44 and venting passages 30, 31 with regard to each other and with regard to the working chamber of the coupling (bearing 22) and bearing 23.

As soon as the pressure in the air reservoir 14 has reached the maximum value, said pressure will move the spool 35 downwardly against the thrust of spring 36. This will interrupt the communication between the control passages 39 and 40 while at the same time communication will be established between the discharge conduit 50 and the return conduit 53 through the intervention of the control passages 51 and 52. The return conduit 53 leads to the oil reservoir 38.

The automatically controlled filling control valve 78 with the displaceable valve spool 55 serves for infinitely varying the filling of the coupling. In this connection, the superimposed pressure as well as the centrifugal pressure of the coupling fluid which is effective to its maximum extent on the coupling circumference only will act upon the lower end surface 57 of the valve spool 55 through the connecting passage 56. On the other hand, only the superimposed pressure is conveyed through the upper end surface 59 of the control piston 55 through the passage 58 which starts at a point which is close to the axis of the coupling casing. Thus, the valve spool 55 is solely under the influence of the centrifugal pressure displaced against the thrust of spring 60 and releases such a portion of the triangularly shaped discharge cross section 61 which corresponds to the respective centrifugal pressure. The coupling oil then passes from said discharge opening 61 through a return conduit 62 into the oil reservoir 38. Thus, at high secondary speed and high centrifugal pressure, a large discharge cross section and a low coupling filling will automatically be provided and similarly a small discharge cross section and high coupling filling will automatically be provided at low secondary speed and low centrifugal pressure.

In order to increase the safety of the coupling and to prevent a damaging thereof, a relief valve may be provided as protection against excessive speed. This relief valve will open up a discharge passage for the coupling fluid whenever the centrifugal pressure of the coupling fluid is exceeded which corresponds to the maximum admissible speed of the driven machine for instance of a piston type compressor. Thus, if the other control elements of the coupling fail, the speed of the driven machine will be limited by the relief valve. Such an arrangement is shown on the right hand side of FIG. 3. As will be seen therefrom, the safety valve comprises a valve spool 63 and a spring 64. If the generally very reliable coupling control should for some reason fail, the centrifugal pressure of the coupling fluid produced by the excessive speed will then move the valve body 63 downwardly so that the working chamber of the coupling will through the discharge passage 65 and the conduit 66 be discharged at least to such an extent that the compressor will remain within its permissible speed.

All parts of the coupling control are easily accessible from the outside and can easily be surveyed. This coupling control is of particular advantage in connection with the fields of application set forth in the introductory portion to the specification and is characterized by a particularly high safety standard.

In addition to the above mentioned control discharge openings, the arrangement according to the invention additionally comprises a bleeder bore 67 with small cross section through which for purposes of cooling during the coupling operation, a small quantity of hot actuating fluid can continuously escape.

It is, of course, to be understood that the present invention is, by no means, limited to the particular arrangements and constructions shown in the drawings but also comprises any modifications within the scope of the appended claims.

What we claim is:

1. In combination in a power plant: a prime mover, a pump wheel drivingly connected to said prime mover, a turbine wheel confining with said pump wheel a working chamber adapted to receive actuating fluid, a machine of a type requiring a high coupling slip for a considerable period of operation while simultaneously requiring its maximum torque of operation, said machine being drivingly connected to said turbine wheel, a stationary housing encasing said wheels and sealing the interior thereof toward the outside, first control means supported by said housing and including a valve chamber having first passage means for connection with a delivery pump and having second passage means for connection with said working chamber, said valve chamber also having third passage means for connection with a discharge and having fourth passage means for connection with said working chamber, a control element movably mounted in said valve chamber and operable selectively to move into a first position for connecting said first passage means with said second passage means to supply fluid under superimposed pressure to said working chamber or into a second position for connecting said third passage means with said fourth passage means, a second control means also supported by said housing and having an inlet opening communicating with said working chamber and having an outlet opening for connection with a discharge, said second control means also including a movable control element operable infinitely to vary the area of said outlet opening, a conduit means leading from said working chamber to the control element of said second control means for automatically controlling the movement of said control element in response to a centrifugal pressure of the actuating fluid in said working chamber, and spring means continuously urging said control element of said second control means into position for reducing the discharge of actuating fluid from said working chamber through said second control means, the arrangement being such that said second control means is influenced on one hand by the centrifugal force and the superimposed pressure of the actuating fluid in a direction of reducing the filling of said coupling and on the other hand is influenced by the superimposed pressure and said spring means in the direction of increasing the filling of said coupling.

2. In a fluid coupling, a sectional stationary housing, a pumping wheel and a turbine wheel mounted coaxially within said housing and having radially extending wall members of substantially equal radius forming a working chamber for receiving actuating fluid for said coupling, the radially extending wall member of said turbine wheel having a circumferential element at its periphery extending axially to overlie the outer periphery of the radially extending wall member of said pumping wheel and having openings therethrough to discharge fluid from said chamber, said element having a part extending radially inwardly to form a portion overlapping the outer portion of the radially extending wall member of said pumping wheel, the overlapping portions of said part and said pumping wheel wall member being formed as complementary toothed elements with intervening spaces so that the two wheels may be assembled by relative axial movement with the teeth of one member passing through the opposite spaces of the other member.

3. In a fluid coupling, a sectional stationary housing, a pumping wheel and a turbine wheel mounted coaxially within said housing and having radially extending wall members of substantially equal radius forming a working chamber for receiving actuating fluid for said coupling, said housing having an inlet to supply fluid to said working chamber and an outlet adjacent the periphery of said wheels to discharge fluid from said coupling and control means for said fluid supply, said control means closing said outlet when said inlet is open and being operable to close said inlet and open said outlet, the radially extending wall member of said turbine wheel having a circumferential element at its periphery extending axially to overlie the outer periphery of the radially extending wall member to said pumping wheel and having openings therethrough to discharge fluid from said chamber, said element having a part extending radially inwardly to form a portion overlapping the outer portion of the radially extending wall member of said pumping wheel, the overlapping portions of said part and said pumping wheel wall member being formed as complementary toothed elements with intervening spaces so that the two wheels may be assembled by relative axial movement with the teeth of one member passing through the opposite spaces of the other member, said intervening spaces and said openings providing discharge ports for said working chamber for fast discharge of fluid to said outlet when said outlet is open.

4. In combination in a power plant: a prime mover; a pump wheel drivingly connected to said prime mover; a turbine wheel confining with said pump wheel a working chamber adapted to receive actuating fluid; a machine of a type requiring a high coupling slip for a considerable period of operation while simultaneously requiring its maximum torque of operation; said machine being drivingly connected to said turbine wheel; a stationary housing encasing said wheels and sealing the interior thereof toward the outside; first control means supported by said stationary housing and including a valve chamber having first passage means for connection with the delivery pump and having second passage means for connection with said working chamber; said valve chamber also having third passage means for connection with a discharge and having fourth passage means for connection with said working chamber; a control element movably mounted in said valve chamber and operable selectively to move into a first position for connecting said first passage means with said second passage means, or into a second position for connecting said third passage means with said fourth passage means; and a second control means also supported by said stationary housing and having an inlet opening communicating with said working chamber and having an outlet opening for connection with a discharge; said second control means also including a movable control element operable to infinitely vary the area of said outlet opening and conduit means leading from said working chamber to the control element of said second conduit means for automatically controlling the movement of said control element in response to a certain centrifugal pressure of the actuating fluid in said working chamber.

5. In combination, a prime mover having a wide range of speed above a minimum speed, a driven machine operable at a more uniform speed within a very narrow range relative to the range of speed of said prime mover so that the operative speed approximates the minimum speed of said prime mover, a fluid coupling driven by said prime mover and driving said driven machine at approximately the speed of said prime mover at its minimum speed and with substantially less increase in speed as said prime mover increases in speed, fluid supply means to supply fluid to said fluid coupling from a source of fluid pressure, to provide a superimposed pressure, said fluid coupling in operation producing centrifugal pressure in the fluid therein which increases with increase in speed of said prime mover, said fluid coupling having a discharge outlet, and control means to control the flow of fluid from said discharge outlet, said control means being actuated by the centrifugal pressure produced by operation of said coupling by said prime mover to vary the flow from said discharge outlet, said control means providing increase of flow with increase of said centrifugal pressure resulting from increase of speed of said prime mover above said minimum to decrease the volume of fluid in said coupling, the total force exerted by said superimposed pressure on said control means being zero, so that the slip in said coupling increases with increase in speed of said prime mover above said minimum to decrease the speed of said driven machine relative to the prime mover and thereby maintain the speed of said driven machine within said narrow range while the speed of said prime mover varies through a wide range.

6. In combination, a prime mover having a wide range of speed above a minimum speed, a driven machine operable at a more uniform speed within a very narrow range relative to the range of speed of said prime mover so that the operative speed approximates the minimum speed of said prime mover, a fluid coupling having a stationary housing enclosing coupling elements driven by said prime mover and driving said driven machine at approximately the speed of said prime mover at its minimum speed and with substantially less increase in speed as said prime mover increases in speed, fluid supply means to supply fluid to said fluid coupling from a source of fluid pressure to provide a superimposed pressure, said fluid coupling in operation producing centrifugal pressure in the fluid therein which increases with increase in speed of said prime mover, said fluid coupling having a discharge outlet and an inlet and a second outlet adjacent said inlet, valve means to close said second outlet and open said inlet to admit fluid to said chamber, and operative by completion of its operation by said driven machine to close said inlet and open said outlet to empty said housing to allow idling of said coupling, and control means to control the flow of fluid from said discharge outlet, said control means being subject to the centrifugal pressure and the superimposed pressure to increase said flow and subject to the superimposed pressure to decrease said flow so that said control means is actuated by the centrifugal pressure produced by operation of said coupling by said prime mover to vary the flow from said discharge outlet, said control means providing increase of flow with increase of said centrifugal pressure resulting from increase of speed of said prime mover above said minimum to decrease the volume of fluid in said coupling, so that the slip in said coupling increases with increase in speed of said prime mover above said minimum to decrease the speed of said driven machine relative to the prime mover and thereby maintain the speed of said driven machine within said narrow range while the speed of said prime mover varies through a wide range.

7. In a fluid coupling, a stationary housing, a pumping wheel and a turbine wheel within said housing forming a working chamber for receiving actuating fluid for said coupling, fluid supply means to supply fluid pressure to said chamber to provide a superimposed pressure, said pumping wheel circulating said fluid in said chamber to drive said turbine wheel and to produce a resultant centrifugal pressure in said fluid, said fluid coupling having a discharge outlet, and control means to control the flow of fluid from said discharge outlet, said control means being actuated by the centrifugal pressure in the fluid coupling to change the discharge from said outlet with change in said centrifugal pressure, the total force of said superimposed pressure acting on said control means being equal to zero, so that fluid is emitted through said outlet and the effective area of said outlet is varied as the centrifugal pressure and the slip of said coupling increases with increase of speed of said pumping wheel to reduce the relative speed of said turbine wheel.

8. In a fluid coupling, a stationary housing, a pumping wheel and a turbine wheel within said housing forming a working chamber for receiving actuating fluid for said coupling, fluid supply means to supply fluid from a source of fluid pressure to said chamber to provide a superimposed pressure, said pumping wheel circulating said fluid in said chamber to drive said turbine wheel and to produce a resultant centrifugal pressure in said fluid, said fluid coupling having a discharge outlet, and control means to control the flow of fluid from said discharge outlet, said control means comprising a valve having a port for the discharge of fluid, a valve member movable to expose an area of said port to said fluid according to movement of said member, said valve being spring-urged to port closure position and having a surface exposed to the fluid under said centrifugal and superimposed pressure exerting a force tending to move said valve member to open said port and having a second surface exposed to fluid under said superimposed pressure exerting a force tending to move said valve to close said port, so that said valve varies the open area of said port according to the centrifugal pressure of the fluid.

References Cited in the file of this patent

UNITED STATES PATENTS

| | | |
|---|---|---|
| 2,018,616 | Martyrer et al. | Oct. 22, 1935 |
| 2,024,842 | Bauer et al. | Dec. 17, 1935 |
| 2,062,281 | Alison | Dec. 1, 1936 |
| 2,223,715 | Berger | Dec. 3, 1940 |
| 2,372,326 | Hewitt | Mar. 27, 1945 |
| 2,461,217 | Lapsley et al. | Feb. 8, 1949 |
| 2,601,548 | Monroe | June 24, 1952 |

FOREIGN PATENTS

| | | |
|---|---|---|
| 423,347 | Great Britain | Jan. 30, 1935 |
| 446,530 | Great Britain | Apr. 27, 1936 |
| 518,082 | Great Britain | Feb. 16, 1940 |